Figure 7:
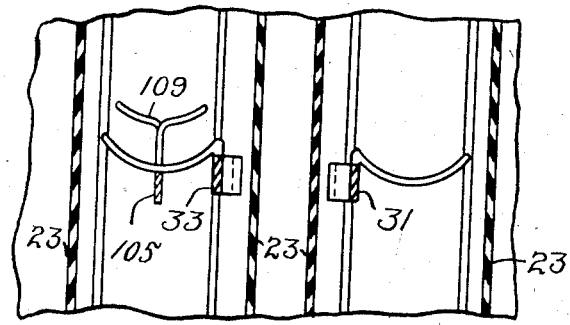

Nov. 11, 1941.        J. R. GOMERSALL        2,262,280
AUTOMATIC ELECTRIC TOASTER
Filed April 10, 1941        3 Sheets-Sheet 1
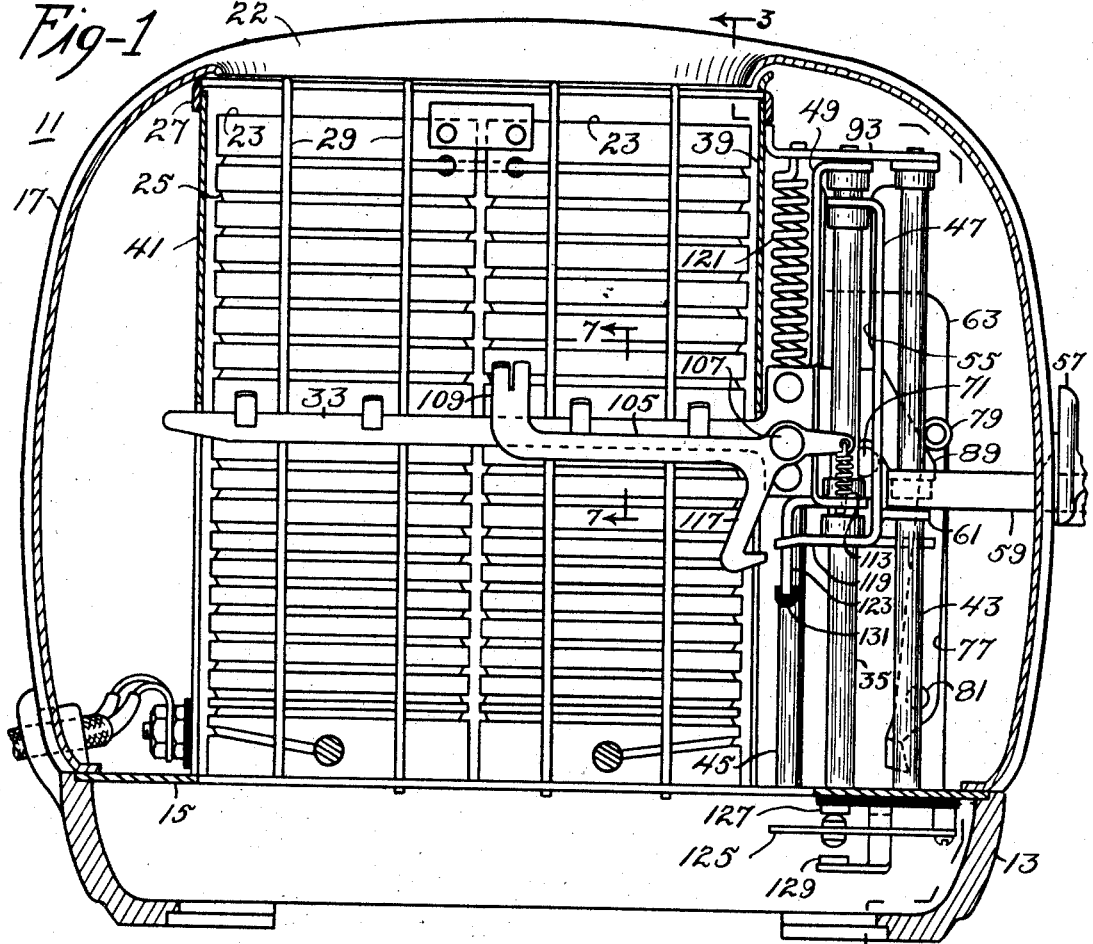
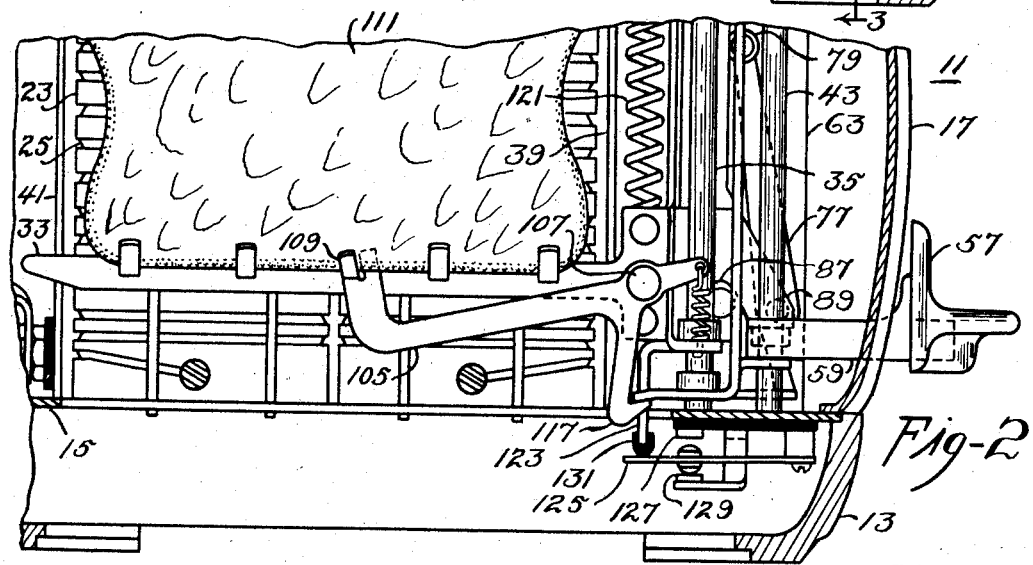
INVENTOR.
JOHN R. GOMERSALL
BY
ATTORNEY.

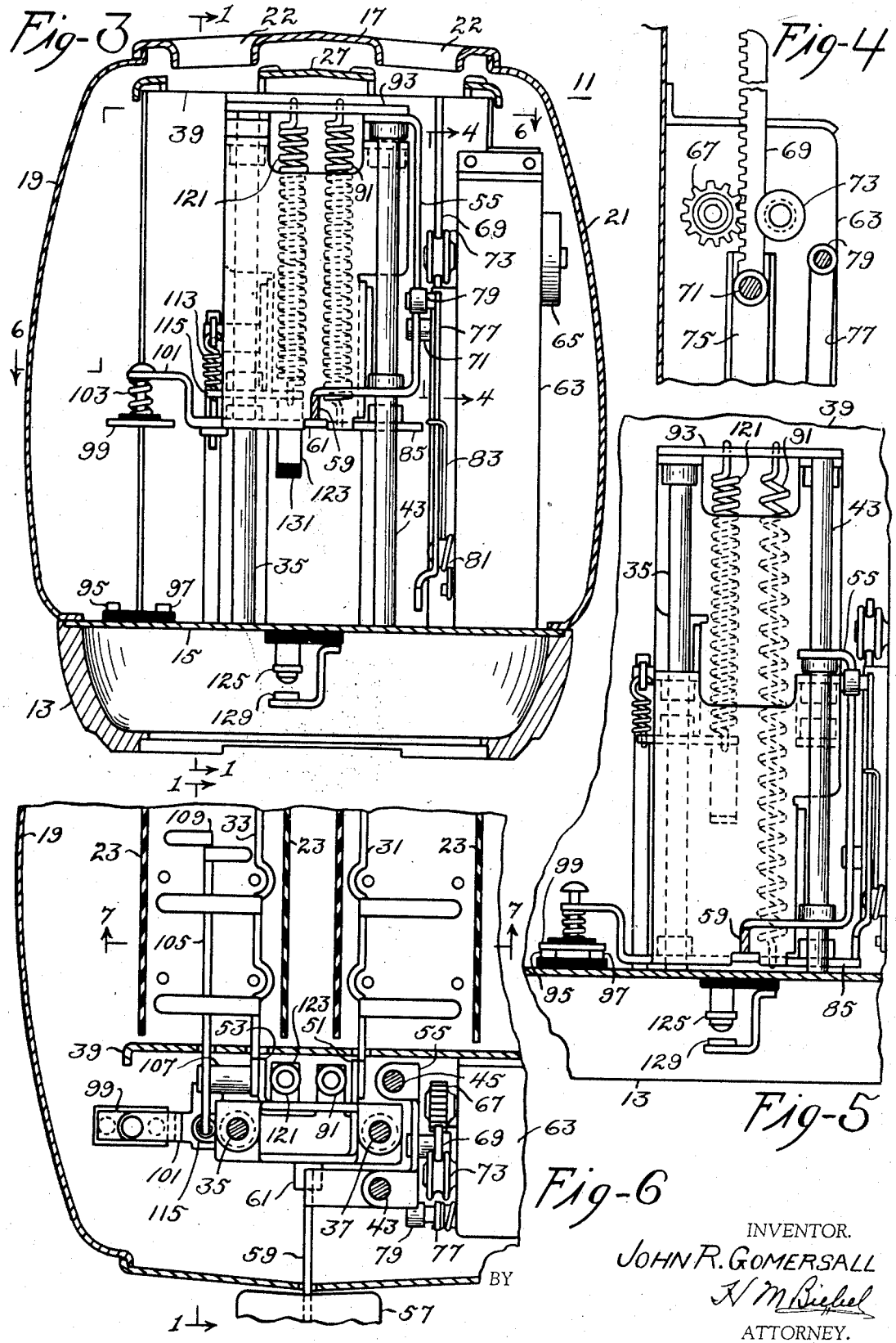

Nov. 11, 1941.  J. R. GOMERSALL  2,262,280
AUTOMATIC ELECTRIC TOASTER
Filed April 10, 1941   3 Sheets-Sheet 3

INVENTOR.
JOHN R. GOMERSALL
BY
ATTORNEY.

Patented Nov. 11, 1941

2,262,280

UNITED STATES PATENT OFFICE 2,262,280

AUTOMATIC ELECTRIC TOASTER

John R. Gomersall, Elgin, Ill., assignor to McGraw Electric Company, Elgin, Ill., a corporation of Delaware Application April 10, 1941, Serial No. 387,856

5 Claims. (Cl. 219—19)

My invention relates to electric cooking devices and particularly to automatic electric toasters.

An object of my invention is to provide a plural-slice toaster with means for permitting the proper toasting of only a single slice of bread in said toaster with attendant reduction in the amount of electric energy translated into heat.

Another object of my invention is to provide a two-slice toaster in which the respective bread carriers are unsecured to each other and only a single one of the carriers is provided with an actuating knob, the other carrier being interlocked with said first carrier only in case a slice of bread is positioned thereon.

Other objects of my invention will either be apparent from a description of one form of device embodying my invention or will be pointed out in the course of such description and set forth in the appended claims.

Figure 8:
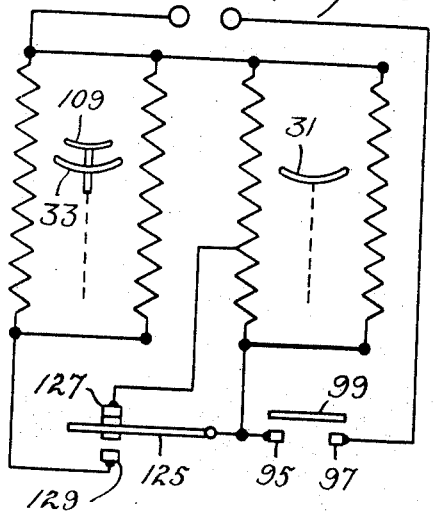
Figure 9:
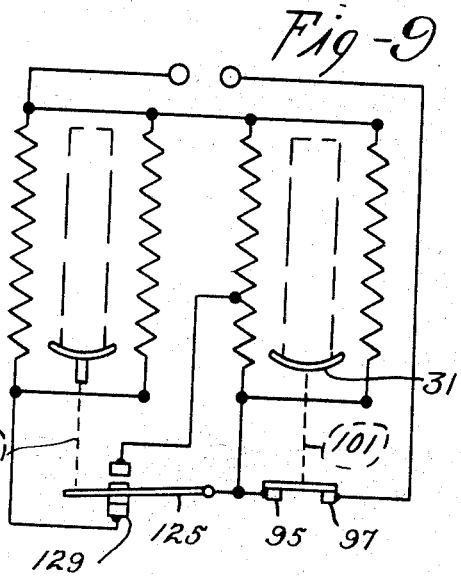
Figure 10:
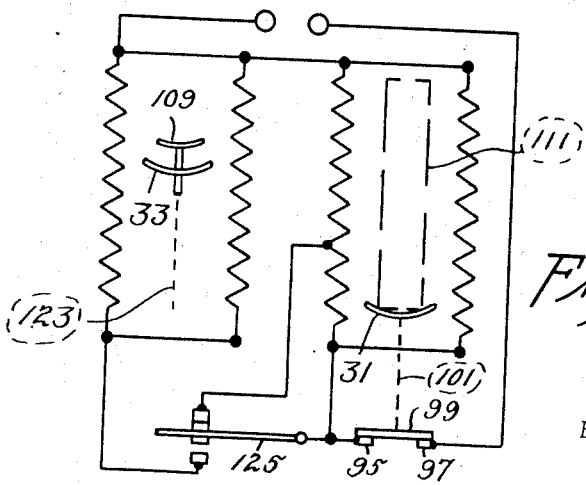

In the drawings,

Figure 1 is a longitudinal vertical sectional view through a toaster embodying my invention taken on the lines 1—1 of Figs. 3 and 6, the parts being shown in normal or non-toasting position, Fig. 2 is a fragmentary view similar to Fig. 1 except that the parts are shown in toasting position when a bread slice is positioned on each bread carrier, Fig. 3 is a sectional view on the line 3—3 of Fig. 1, the case being shown in section and the parts in the mechanism chamber being shown in front elevation and in non-toasting position, Fig. 4 is a fragmentary section on the line 4—4 of Fig. 3 to show the timer rack and pinion, Fig. 5 is a fragmentary view similar to Fig. 3 except with the parts in position for toasting one slice of bread only, Fig. 6 is a fragmentary horizontal sectional view on the line 6—6 of Fig. 3, Fig. 7 is a fragmentary vertical sectional view taken on the line 7—7 of Fig. 1, Fig. 8 is an electrical diagram showing the electrical circuit connections for non-toasting position with the parts as shown in Fig. 1, Fig. 9 is an electrical diagram showing the circuit connections for toasting a slice of bread in each of the two toasting compartments, with the parts in position as shown in Fig. 2, and, Fig. 10 is a diagram similar to Figs. 8 and 9 but showing the circuit connections for toasting a single slice of bread only with the parts shown as in Fig. 5.

An automatic electric toaster, designated generally by the numeral 11, may include a skeleton bottom frame 13 which may be made of any suitable or desired moulded composition material and which has a thin sheet metal bottom plate 15 mounted thereon at its upper surface. The toaster includes further a casing consisting of a central portion 17 of inverted U-shape and two side walls 19 and 21 which may be of any suitable or desired shape and are shown generally only since they constitute no part of my invention.

Since my invention relates more particularly to a plural-slice toaster, I have illustrated a two-slice toaster, the central casing portion 17 being provided with two bread-inserting and toast-removing openings 22. I provide also a plurality of vertically extending planar electric heating elements each comprising one or more sheets 23 of electric-insulating material, such as mica, and a resistor member 25 thereon. I prefer to use two spaced vertically planar heaters for each slice of bread to be simultaneously toasted in such a plural-slice toaster. The bottom edge of each of the vertical heating elements may be held in proper operative position against or immediately above the upper surface of bottom plate 15 by any suitable or desired means and I have shown a top intermediate frame plate 27 which has means for properly holding the upper edges of the respective planar heating elements in their desired position substantially fixed so that I may center a slice of bread to the toasted between each pair of spaced heating elements by the use of guard and guide wires 29, all in a manner known in the art. The top frame plate is provided with two bread insertion openings registering with the openings 22.

I provide also a pair of bread carriers 31 and 33 positioned between each pair of planar heating elements and vertically movable from an upper non-toasting position shown in Fig. 1, of the drawings, to a lower toasting position shown in Fig. 2 of the drawings.

Means for causing proper vertical movement of the carriers either one at a time or both at the same time as may be desired, may include a pair of spaced vertical standards 35 and 37 which are positioned in the mechanism chamber in front of a front intermediate wall 39, there being provided also a rear intermediate wall 41, all in a manner now well known in the art. The lower ends of the standards 35 and 37 may interfit with plate 15. I provide further a second pair of spaced vertical standards 43 and 45, the plane of these latter named vertical standards being at right angles to the plane of the standards 35 and 37, all as will be noted from Fig. 6 of the drawings. I provide a pair of carriages 47 and 49 which have vertical movement on the vertical standards 35 and 37, it being possible to move the carriage 47 downwardly on the two standards without moving the second carriage 49 downwardly, for a purpose which will hereinafter appear.

The right hand carrier 31 is mechanically rigidly connected to a rearward extension 51 on carriage plate 47 so that downward movement of carriage 47 will cause downward movement of carrier 31. Carrier 33 is mechanically connected to a rearward extension 53 on carriage 49 so that downward movement of carriage 49 will cause downward movement of bread carrier 33.

Means for causing downward movement of either carriage 47 and carrier 31 alone or downward movement of both carriages 47 and 49 and attendant downward movement of both carriers may comprise a third carriage 55 which is vertically movable on vertical standards 43 and 45. It may here be noted that each of the carriages comprise a central plate portion and lateral extensions thereon having openings therein to permit of movement thereof on the vertical standards. The carriage 55 is so positioned relatively to the carriage 47 that downward movement of carriage 55 will cause downward movement at least of carriage 47 and of carrier 31.

Means to cause downward movement of the third carriage 55 may comprise a knob 57 which is secured to a forwardly extending portion 59 constituting an integral part of carriage 55 or secured thereto, the rear end portion of projection 59 being adapted to engage a forwardly projecting lug 61 at the bottom end of carriage 47 to cause movement of carriage 47 by downward pressure on knob 57.

I provide a mechanical timer 63 which is located at the right-hand portion of the mechanism chamber and at the right of the two vertical standards 43 and 45. Reference may be had to Ireland Patent No. 1,866,808 for details of construction of this timer but I shall refer here only to such details as are necessary for a more complete understanding of my invention. The timer is provided with a clock spring 65 on an arbor having also mounted thereon a pinion 67 which is adapted to mesh with a rack bar 69 having lateral pin 71 at its lower end and held in mesh with the pinion 67 by a grooved roller 73. I may provide a guide or track 75 of substantially channel-shape to guide the lower end of the rack bar 69 and particularly the pin 71 thereon. A detent lever 77 having a pin 79 extending laterally therefrom at its upper end is pivotally mounted on a short stud 81 adjacent its lower end and is held in operative position by a small spring 83, all in a manner now well known in the art.

As it is desired to maintain the carrier 31 in its lowered position during a toasting operation, carriage 47 is provided with a projection 85 adapted to move under and engage the lower end of detent lever 77. Means for causing downward movement of the rack bar 69 when the third carriage 55 is moved downwardly may include a recess 87 of substantially inverted V-shape adapted to have the pin 71 fit therein so that downward movement of carriage 55 will cause downward movement of the rack bar 69 and winding up of the actuating spring for the timer. As soon as the operator releases his pressure on knob 57, carriage 55 will be moved upwardly because of the unwinding of the spring 65 but if carriage 47 was moved downwardly far enough, the lug or projection 85 thereon would engage under the lower end of lever 77 to hold the carriage 47 and the carrier 31 in its lower or toasting position.

Means for causing release of carriage 47 from the detent lever 77 may include an inclined surface 89 on carriage 55, this surface engaging pin 79 when carriage 55 has been moved upwardly far enough, with resultant upward movement of carrier 31 by the action of a spring 91 having its upper end secured to a bracket 93 and its lower end secured to a rearwardly extending projection 94. The bracket 93 may also hold the upper ends of the standards 35 and 37.

Since, as hereinbefore stated, the two bread carriers are not normally fixedly secured to each other, the hereinbefore described operation of bread carrier 31 permits of toasting a single slice of bread in a two-slice toaster and in order to do this it is only necessary to press downwardly on the actuating knob 57 after having placed a slice of bread on carrier 31, that is, in the right-hand toasting compartment as seen from the front of the toaster.

Means for causing energization of the heating elements associated with and spaced apart from the right-hand bread carrier 31 may include a pair of contact members 95 and 97 insulatedly mounted on bottom plate 15 and a contact bridging member 99 secured to a lateral projection 101 on carriage 47 adjacent the bottom thereof and extending toward the left, as seen from the front of the toaster. Contact bridging member 99 is shown generally only in Fig. 3 of the drawings and may be yieldingly pressed downwardly by a coil spring 103, it being understood that contact bridging member 99 is suitably electrically insulated from the metal parts by which it is carried.

Should it be desired to simultaneously toast two slices of bread, this is effected by the provision of a bell crank lever 105 pivotally mounted on the front end portion of carrier 33 as by being pivotally supported by a short stud 107 (see Fig. 6). The substantially horizontally extending longer arm of bell crank lever 105 is provided with an upwardly extending end portion 109 having laterally extending portions, as seen in Fig. 7 of the drawings, to receive the lower edge of a slice of bread 111, as shown in Fig. 2. The bell crank lever 105 is normally yieldingly maintained in the position shown in Fig. 1 of the drawings by a small biasing spring 113 connected thereto and to a lug 115 constituting a part of carriage 49. Bell crank lever 105 is provided with a depending arm 117 having a hook end.

Carriage 47 is provided with a lateral and rearwardly extending projection 119, normally clearing the hook end of portion 117 of the bell crank lever when no slice of bread is resting on the left-hand bread carrier 33 but adapted to engage with the hook portion of arm 117 when a slice of bread is resting upon carrier 33, all as will be seen from Figs. 1 and 2 of the drawings. It is thus evident that when no slice of bread has been placed upon the left-hand carrier 33 and downward movement of knob 57 is effected to toast a slice of bread placed upon the right-hand carrier 31, the left-hand carrier 33 will remain in its upper or non-toasting position being yieldingly biased thereto by a spring 121 similar to spring 91 applied to the right-hand carrier. This spring 121 may have one end thereof connected with the bracket 93 and may have its lower end connected to a rearwardly and downwardly extending projection 123 of substantially L-shape on carriage 49, the further purpose whereof will be described later.

I have hereinbefore stated that I prefer to provide a pair of spaced vertical planar heating elements for each slice or bread to be toasted so that in the case of a two-slice toaster I provide a total of four electric heating elements, as will be noted schematically from Figs. 9 to 10. I have found that it is necessary to make the wattage of the two outer heaters somewhat higher than the wattage of the two inner heaters when a toaster of this type is to be used to always toast two slices of bread simultaneously. However, if it is desired to toast only a single slice of bread as, say, in the right-hand toasting chamber on carrier 31, without energizing the heaters for carrier 33 as may be done by means now to be described, it is necessary that the inner electric heater associated with carrier 31 have a greater than ordinary or normal energy imput since the two inner heaters aid each other when simultaneously energized to maintain the desired even temperature on both sides of two slices of bread being toasted simultaneously.

In order to take care of this I provide a second auxiliary switch connected as shown in Figs. 8 to 10 inclusive, this auxiliary switch comprising a resilient contact bar 125 insulatedly mounted on the bottom of bottom plate 15, as will be seen by reference to Figs. 1, 2 and 5. Normally contact bar 125 is yieldingly biased into engagement with an upper contact 127 but may be moved downwardly out of engagement from contact 127 and into engagement with the lower contact 129 by projection 123 hereinbefore described, which may have mounted thereon a lug 131 of electric-insulating material. Thus when only bread carrier 31 is moved downwardly as when only a single slice of bread is to be toasted, contact arm 125 of the auxiliary heater control switch will remain in the position shown in Fig. 10 of the drawings and an inspection of the connections provided thereby will show that the two left-hand electric heaters associated with carrier 33 will not be energized when contact bridging member 99 has been moved into engagement with fixed contacts 95 and 97 and further that a part only of the inner heating element associated with carrier 31 will be energized whereby a greater amount of electric energy will be translated into heat and it is only necessary to ensure that the energized portion of the inner electric heater is uniformly distributed relatively to the slice of bread on carrier 31 to ensure that the inner side of a slice of bread being toasted will be browned to the same degree as is the outer side.

When two slices of bread are placed upon the respective carriers 31 and 33, with attendant pivotal movement of arm 105 to the position shown in Fig. 2 of the drawings, downward pressure of the operator on actuating knob 57 will cause downward movement not only of the right-hand carrier 31 but also of the left-hand carrier 33 because the two carriers are now mechanically interlocked. The lug 131 on projection 123 will cause downward movement of contact arm 125 and engagement thereof with the lower contact 129 and an inspection of Fig. 9 of the drawings will show that, under these conditions, all four of the heating elements will be normally energized with all of the right-hand inner heater carrying current so that both sides of both pieces of bread on the individual carriers will be properly toasted to the same degree.

My invention thus provides a relatively simple means actuable by the presence or absence of a second slice of bread to be toasted simultaneously with a first slice of bread for ensuring energization of all of the heaters to a proper degree or the energization of only those heaters operatively associated with one slice of bread. It will be noted that the device embodying my invention provides a plural-slice toaster in which an auxiliary heater control switch is effective to deenergize the electric heaters of all but one toasting chamber and that it is necessary to insert a plurality of slices of bread to cause a change in the electric connections by the auxiliary switch to cause energization of all of the heaters when all of the bread carriers have been moved into toasting position.

Various modifications may be made in the structure shown herein and all such modifications are to be considered as being covered by the appended claims as come clearly within the scope thereof.

I claim as my invention:

1. In a two-slice automatic electric toaster comprising toast heating elements, a first and a second bread carrier movable into toasting and non-toasting positions relatively to said heating elements and normally yieldingly biased into non-toasting position, the improvement comprising means on said first bread carrier for causing movement of said first carrier alone into toasting position and means on said second carrier actuable by a slice of bread on the second carrier to cause said second carrier to be interlocked with said first carrier and to be moved into toasting position simultaneously with said first carrier.

2. In a two-slice automatic electric toaster comprising toast heating elements, a first and a second bread carrier movable into toasting and non-toasting positions relatively to said heating elements and normally yieldingly biased into non-toasting position, the improvement comprising means on said first bread carrier for causing movement of said first carrier alone into toasting position, means on said second carrier actuable by a slice of bread on the second carrier to cause said second carrier to be interlocked with said first carrier and to be moved into toasting position simultaneously with said first carrier and switching means controlled by said carriers and effective when only said first carrier is moved into toasting position to cause energization of only those heating elements required to properly toast a slice of bread on said first carrier.

3. In a two-slice automatic electric toaster comprising toast heating elements, a first and a second bread carrier movable into toasting and non-toasting positions relatively to said heating elements and normally yieldingly biased into non-toasting position, the improvement comprising means on said first bread carrier for causing movement of said first carrier alone into toasting position, means on said second carrier actuable by a slice of bread on the second carrier to cause said second carrier to be interlocked with said first carrier and to be moved into toasting position simultaneously with said first carrier and switching means controlled by said carriers and effective when only said first carrier is moved into toasting position to cause energization of only those heating elements required to properly toast a slice of bread on said first carrier and effective when a slice of bread is placed on each carrier and both carriers are moved simultaneously into toasting position to cause energization of all of said heating elements.

4. In a two-slice automatic electric toaster comprising toast heating elements, a first and a second bread carrier normally unattached to each other, movable into toasting and non-toasting positions relatively to the heating elements and normally yieldingly biased into non-toasting position, means to move said carriers into toasting position, means on said second carrier actuable by a slice of bread on the second carrier to cause mechanical interlocking of the two carriers, a main and an auxiliary switch for said toast heating elements normally yieldingly biased into predetermined positions and means on the respective bread carriers to cause energization of all of said toast heating elements through said switches when a slice of bread is placed on each carrier and both carriers are moved into toasting position and to cause energization through said switches of only those of said heating elements required to toast one slice of bread placed on said first carrier, when said first carrier is moved into toasting position.

5. A two-slice automatic electric toaster comprising a plurality of electric toast heating elements, a first and a second bread carrier normally unsecured to each other, movable into toasting and non-toasting positions relatively to the heating elements and normally yieldingly biased into non-toasting position, means to move said carriers into toasting position, means on said carriers actuable by the weight of a slice of bread on said second carrier to mechanically interlock said two carriers, a main heating element control switch normally yieldingly biased into open position and movable into closed position by said first carrier when it is moved into toasting position, an auxiliary heating element control switch normally yieldingly biased into a first operative position to effect energization of the heating elements adapted to operate on a slice of bread on said first bread carrier when said main control switch is closed by movement of the first bread carrier into toasting position, said auxiliary control switch being moved into a second operative position and effective with said main control switch to cause energization of all of said heating elements when both of said carriers are moved into toasting position with a slice of bread on each carrier.

JOHN R. GOMERSALL.